Oct. 14, 1969　　G. R. SPIES, JR　　3,472,481

SELF-ALIGNING VALVE CLOSURE

Filed Oct. 22, 1965

INVENTOR
GEORGE R. SPIES, JR.
BY
Edmund W Bopp
AGENT ns patent office 3,472,481
Patented Oct. 14, 1969

3,472,481
SELF-ALIGNING VALVE CLOSURE
George R. Spies, Jr., Murray Hill, N.J., assignor to Air Reduction Company, Incorporated, New York, N.Y., a corporation of New York
Filed Oct. 22, 1965, Ser. No. 501,467
Int. Cl. F16k 25/00, 29/00
U.S. Cl. 251—85     3 Claims

ABSTRACT OF THE DISCLOSURE

The invention described herein involves a self-aligning seat mechanism for use in a valve. The circular seat has a conical shape and is supported by a flexible stem whereby the seat may align itself with the valve seat due to the self-centering action of the conical shaped seat and the flexible nature of the supporting stem.

---

This invention relates to self-aligning valve closures and more particularly to the combination of a valve stem and cooperating seating element for making a valve self-aligning.

An object of the invention is to improve the action of a self-aligning valve.

Another object is to reduce the force required to obtain a complete seal.

Another object is to eliminate unwanted looseness of the seating element of a self-aligning valve as mounted in the valve stem.

A further object is to facilitate the replacement of a seating element in a valve stem.

A further object is to reduce the cost of manufacturing self-aligning valves.

A feature of the invention is a resilient, elastic seating element, sufficiently resilient to insure a tight seal with minimum necessary applied torque.

A related feature is that the seating element may consist of a single piece.

Another feature is that the seating element has sufficient elasticity to enable it to maintain itself in approximate central position against gravity.

Another feature is that the elasticity of the seating element enables it to spring back to central position after release from the seated position.

A further feature is that the seating element is automatically pressed home in the valve stem with each closing of the valve.

In accordance with the invention, the valve stem is provided with an axial recess for receiving and retaining a resilient, elastic seating element. The shape of the seating element is such as to provide an elongated stem and a seating portion, the latter having a shoulder. The recess in the valve stem has an inner portion into which the stem of the seating element is received and retained in a pressure fit, and an outer portion in which the stem of the seating element is supported in a loose fit. The shoulder portion of the seating element is adapted to bear upon the face of the recessed end of the valve stem to enable the valve stem to force the seating element to form the desired seal as the valve stem is advanced.

Other objects, features and advantages will appear from the following more detailed description of illustrative embodiments of the invention, which will now be given in conjunction with the accompanying drawings.

Figure 1:
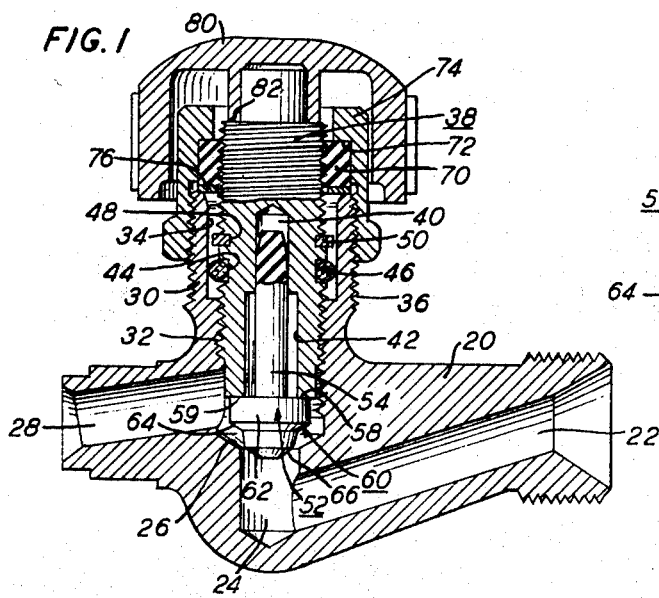
FIG. 1 is a sectional view of a valve utilizing a valve stem and a seating element made in accordance with the invention, showing the valve open part way.

Referring to the drawings, 20 is the body of a valve, having an inlet passage 22, an intermediate passage 24, a valve seat 26, and an outlet passage 28. For receiving, supporting and operating a valve stem, the body 20 has a cylindrical portion 30 approximately concentric with the valve seat 26 and intermediate passage 24. The portion 30 is bored and internally threaded at 32, counterbored at 34, and externally threaded at 36.

The valve stem is shown at 38, cylindrical in form and threaded externally. It is of such diameter and pitch of thread where it passes through the body of the valve as to mesh with the internal thread 32. The valve stem 38 has a central bore 40 and counter bore 42. About midway of the length of the valve stem 38, there is an exterior circumferential groove 44 for receiving packing, preferably in the form of an O ring 46, and an exterior circumferential groove 48 for receiving a spring retaining ring 50.

Figure 2:
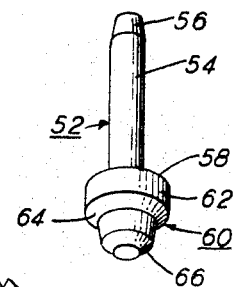
FIG. 2 is a perspective view of the seating element shown in section in FIG. 1.

The seating element or washer is shown at 52, in place in the recessed valve stem 38 in FIG. 1, and in perspective by itself in FIG. 2. The element 52 has an extended cylindrical stem portion 54 of such diameter as to provide a pressure fit in the bore 40, and preferably tapered at 56 for easy insertion. The stem 54 is a loose fit in the counterbore 42. A shoulder 58 on the element 52 is provided to bear upon the face 59 of the valve stem 38 when the element 52 is in place, the length of the element 52 being such as to leave a clearance at the inner end of the bore 40.

The stem of the seating element 52 should be long enough to provide good holding friction to retain the stem securely in the bore 40 and to provide sufficient length for flexure of the stem in the counterbore 42. While, if desired, the stem may be made of minimum length that will function properly for self-alignment, I prefer to make the length of the stem several times its diameter. In a seating element that has been put into successful operation in various valves used in a welding or cutting torch, the stem of the seating element is cylindrical and its length is about five times its diameter. To insure a direct line of thrust from the face of the valve stem to the valve seat through the seating element, the inside diameter of the counterbore 42 should be less than the diameter of the valve seat.

The element 52 has a seating or sealing portion 60 having a cylindrical portion 62 forming the shoulder 58, a seating portion per se 64, and a truncated conical portion 66 for defining a restricted passage in conjunction with the valve seat 26 when the valve is partially opened.

Figure 3:
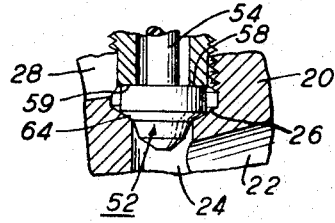
FIG. 3 is a fragmentary sectional view of the seating element and valve seat of the valve shown in FIG. 1 showing the position of the parts when the valve is closed.
Figure 4:
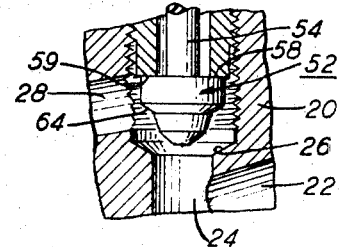
FIG. 4 is a fragmentary sectional view like that shown in FIG. 3 except that the valve is shown as being wide open.

In FIG. 1, the valve is represented as partially opened, showing the restricted passage. The size of this passage is quite sensitive to the exact position of the element 52 and gives a smooth graduation of the flow of fluid through the valve as the valve stem is advanced and withdrawn. FIG. 3 shows the valve fully closed, with seating face 64 in pressure contact with the valve seat 26. FIG. 4 shows the valve fully open with a considerable space between the element 52 and the valve seat 26.

In addition to the O ring packing 46, there is preferably provided a resilient packing sleeve 70 arranged to be compressible between a shoulder 72 in a packing nut 74 and a washer 76 bearing against a face of the body 20 at the opening of the counterbore 34. To provide the compression of the packing sleeve 70, the packing nut 74 is internally threaded to mesh with the external thread 36 on the body 20.

A valve handle 80 is provided, attached to the valve stem 38 as by soldering at 82, or by other suitable means. The handle 80 preferably partially surrounds, or is telescoped around, the packing nut 74 as shown, thereby reducing the total height of projection of the part of the valve assembly that accommodates the valve stem, making the valve as a whole more compact and less subject to damage due to rough handling.

The O ring 46 is made of such cross-sectional diameter as to provide a pressure fit between the groove 44 and the wall of the counterbore 34, and may provide the entire packing seal for preventing escape of fluid around the valve stem 38. The spring retaining ring 50 serves to prevent unintentional complete withdrawal of the valve stem. The packing sleeve 70 may serve primarily to give a desired frictional resistance to the turning of the valve handle 80 and to reduce backlash, so that accurate settings of the valve handle can be made and retained during use. The sleeve 70 is preferably compressed around and into the threads 32 on the valve stem 38 to provide the desired friction and backlash reduction. If desired, the packing nut 74 may be tightened to such an extent as to form a fluid seal at the sleeve 70 to serve as a back up to the fluid seal at the O ring 46, or, if desired, the packing nut 74 may be tightened only sufficiently to obtain the desired "feel," as provided by the resultant friction with the sleeve 70.

The pressure fit of the stem 54 in the bore 40 holds the seating element 52 firmly against any likelihood of its falling out, and the elasticity of the element 52 keeps the element approximately centered at all times when the valve is open or partially open. The resilience of the element 52 together with its loose fit in the counterbore 42 renders the element self-aligning upon closure of the valve, and the elasticity of the element enables it to spring back into its central position when the valve is opened. Upon each closure of the valve, the element 52 is pressed home with the shoulder 58 bearing against the face 59 of the valve stem, facilitated by the clearance between the element 52 and the inner end of the bore 40. The resilience of the element 52 is preferably such as to ensure a tight seal with minimum necessary applied torque.

The element 52 is easily replaced if worn or damaged, either by unscrewing the valve stem, withdrawing and replacing the element 52, or, if more convenient, by substituting another assemblage of valve stem, seating element 52, and handle 80. Due to the resilience of the seating element 52, particles of metal or other hard materials which may be caught in the valve closure are more likely to injure the relatively soft element 52 or become embedded therein than to cause any injury to the valve seat.

The seating element 52 may be a single piece as illustrated herein, or it may be formed by joining two or more parts. The stem portion 54 should have sufficient resilience to enable it to be self-aligning and sufficient elasticity to spring back to a central position when the valve is opened. The seating portion 60 should have the necessary resilience to make a tight closure of the valve and should have the wearing quality desired for the particular service demanded of it.

Figure 5:
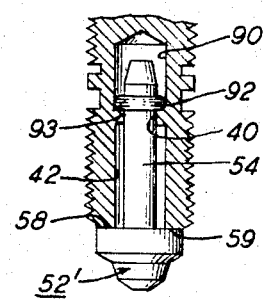
FIG. 5 is a fragmentary sectional view of a valve stem modified as compared to the valve stem shown in FIG. 1, together with a modified form of seating element designed to be retained in the modified valve stem.

FIG. 5 shows an alternate form of recessed valve stem and cooperating seating element for further securing a seating element 52' from accidentally coming out of the recess in the valve stem. In this embodiment, the inner bore 40 in the valve stem is enlarged in its end portion 90 to accommodate a circumferential rib 92 provided on the stem portion 54 of the element 52'. The bore 40 is provided with a shoulder 93 for retaining the ridge 92.

The element 52' is inserted as in the arrangement of FIG. 1, except that the ribbed portion 92 is forced through the bore 40 into the enlarged space 92, where the rib 92 tends to resist removal of the element 52'. Preferably, the spacing between the shoulder 58 and the ridge 92 is such that when the seating element is in place in the valve stem, the stem portion 54 of the seating element is in slight tension between the face 59 of the valve stem and the shoulder 93. Ready replacement of the element 52' is still feasible by merely exerting a somewhat greater pull upon the element than is required in the arrangement of FIG. 1.

A preferred material for the seating element or washer 52 or 52' is nylon which has been impregnated with molybdenum disulfide, although other suitable materials notably other plastics may be used.

Figure 6:
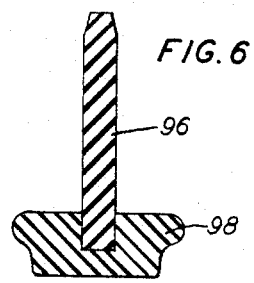
FIG. 6 is a sectional view of an alternative form of seating element.

FIG. 6 shows another embodiment of a seating element in accordance with the invention. Here the seating element comprises two parts, a stem part 96 and a seating part 98. The part 96 is shown with one end embedded in centrally in the part 98. The two parts may differ in physical properties, each being especially adapted for its use. For example, the part 96 may have the desired resilience and elasticity for self-aligning, while the part 98 may have the desired resilience and wear resistance for effecting a tight closure during a long service life. The shape and size of the seating part 98 may differ radically from the shape and size of the seating portion 60 of the element 52 illustrated in FIGS. 1–5.

While illustrative forms of apparatus, methods and processes in accordance with the invention have been described and shown herein, it will be understood that numerous changes may be made without departing from the general principles and scope of the invention.

I claim:

1. In a self-aligning valve, a combination of a valve stem having an axial recess and a cooperating seating element carried by such stem and received in said recess, in which the seating element has a resilient elastic stem portion and a resilient seating portion, first means associated with said seating element stem portion holding the said stem portion of the seating element in position in substantially fixed axial contact with the valve stem over a relatively short portion of the total length of said seating element stem portion in substantial coaxial relationship with a valve seat, said first means including constricting means in said recess, and second means associated with said seating element stem portion permitting transverse movement of the said seating element stem portion over a relatively long portion of said total length between said first means and said seating portion of seating element, whereby said seating element is free to align itself with the valve seat upon closure of the valve and to return by virtue of the elasticity of the said seating element stem portion to a substantially central position upon opening of the valve.

2. In a self-aligning valve, the combination of a valve stem and a cooperating seating element carried by said stem, in which the valve stem has an axial recess therein receiving the seating element in substantially coaxial relationship with a valve seat, and in which the seating element is elastic and comprises an elongated stem portion of length several times its diameter supported in the said axial recess in the valve stem, and said seating element having a seating portion; the said axial recess having an inner portion of a first transverse dimension constituting a pressure fitting portion for the said stem portion of the seating element over a relatively short portion of the total length of said seating element stem, and said axial recess having an outer portion of a second transverse dimension greater than said first dimension, which is a loose fit for said seating element stem portion over a relatively long portion of said total length, providing a length for transverse movement, whereby the elasticity of the seating element in the area of said loose fitting portion of said recess facilitates tight closing of the valve and provides self-alignment of the valve in closing and spring return of the seating element to a central position upon opening of the valve, said seating portion of the seating element having a shoulder at the junction with said seating element stem portion, which shoulder is adapted to bear upon the face of the open end of the valve stem when the seating element is driven home in the said axial recess.

3. In a self-aligning valve, the combination of a valve stem and a cooperating seating element carried by said stem, in which the valve stem has an axial recess therein to receive the seating element in substantially coaxial relationship with a valve seat, and in which the seating element is resilient and elastic and comprises an elongated stem portion of length several times its diameter adapted to be supported in the said axial recess in the valve stem, and said seating element having a seating portion; the said axial recess having an inner portion constituting a pressure fitting portion for the said stem portion of the seating element over a relatively short portion of the total length of said seating element stem portion, and said axial recess having an outer portion which is a loose fit for said seating element stem portion over a relatively long portion of said total length, providing a length for flexure, whereby the resilience of the seating element in said loose fitting portion of said recess facilitates tight closing of the valve and the elasticity of the seating element provides self-alignment of the valve in closing and spring return of the seating element to a central position upon opening of the valve, said axial recess having an innermost portion being enlarged to accommodate an enlarged portion of the said stem portion of the seating element, and the seating element stem portion being provided with a circumferential ridge constituting said enlarged portion, said ridge being located near the end of said seating element stem portion remote from said seating portion, whereby due to the elasticity of the seating element stem portion the same can be inserted into said recess with the said ridge being forced through the said pressure fitting portion of the recess into the said innermost enlarged portion of the recess thereby retaining the seating element securely and removably in place in the valve stem.

References Cited

UNITED STATES PATENTS

| | | | |
|---|---|---|---|
| 2,081,616 | 5/1937 | Diamond | 251—88 |
| 2,118,300 | 5/1938 | Ford. | |
| 2,452,354 | 10/1948 | Bucknell et al. | 251—85 |
| 2,568,615 | 9/1951 | Fischer et al. | 251—86 |
| 2,843,350 | 7/1958 | Wilson | 251—86 |
| 2,952,439 | 9/1960 | Koons | 251—85 X |
| 3,001,545 | 9/1961 | Ziege | 251—86 X |
| 3,385,560 | 5/1968 | Hare | 251—88 |

HENRY T. KLINKSIEK, Primary Examiner

U.S. Cl. X.R.

251—86